(12) United States Patent
Reed et al.

(10) Patent No.: US 8,926,139 B2
(45) Date of Patent: Jan. 6, 2015

(54) GAS-DISCHARGE LAMP REPLACEMENT WITH PASSIVE COOLING

(75) Inventors: William G. Reed, Seattle, WA (US); John O. Renn, Lake Forest Park, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 329 days.

(21) Appl. No.: 12/769,956

(22) Filed: Apr. 29, 2010

(65) Prior Publication Data

US 2010/0277082 A1    Nov. 4, 2010

Related U.S. Application Data (60) Provisional application No. 61/174,913, filed on May 1, 2009.

(51) Int. Cl.
| | |
|---|---|
| *F21V 29/00* | (2006.01) |
| *F21K 99/00* | (2010.01) |
| *H05B 33/08* | (2006.01) |
| *H05B 37/02* | (2006.01) |
| *F21V 23/04* | (2006.01) |
| *F21Y 101/02* | (2006.01) |
| *F21Y 103/02* | (2006.01) |

(52) U.S. Cl.
CPC ........ *H05B 37/0227* (2013.01); *F21V 23/0748* (2013.01); *F21V 29/2231* (2013.01); *F21V 23/0442* (2013.01); *F21K 9/13* (2013.01); *F21V 29/246* (2013.01); *Y02B 20/383* (2013.01); *H05B 33/0803* (2013.01); *F21Y 2101/02* (2013.01); *F21Y 2103/022* (2013.01); *H05B 33/0854* (2013.01); *Y10S 362/80* (2013.01)
USPC ........... 362/294; 315/117; 315/118; 315/159; 315/307; 362/276; 362/373; 362/800

(58) Field of Classification Search
USPC .......... 315/117–118, 159, 307; 362/276, 294, 362/373, 800
See application file for complete search history.

(56) References Cited

U.S. PATENT DOCUMENTS 4,153,927 A    5/1979    Owens
(Continued)

FOREIGN PATENT DOCUMENTS

| DE | 40 01 980 | 8/1990 |
|---|---|---|
| DE | 198 10 827 A1 | 9/1999 |

(Continued)

OTHER PUBLICATIONS

Reed, "Apparatus and Method of Energy Efficient Illumination," U.S. Appl. No. 61/333,983, filed May 12, 2010, 57 pages.

(Continued)

*Primary Examiner* — Jason M Crawford
(74) *Attorney, Agent, or Firm* — Seed IP Law Group PLLC (57) ABSTRACT

An illumination device comprises a solid-state lighting device and a heat sink. The heat sink is configured to be attachable to a fixture for a gas-discharge lamp to retrofit existing gas-discharge fixtures. The heat sink is conductively thermally coupled to the solid-state lighting device to dissipate heat generated by the solid-state lighting device.

30 Claims, 5 Drawing Sheets

(56) References Cited

U.S. PATENT DOCUMENTS

| | | |
|---|---|---|
| 4,237,377 A | 12/1980 | Sansum |
| 5,086,379 A | 2/1992 | Denison et al. |
| 5,150,009 A | 9/1992 | Kling et al. |
| 5,160,202 A | 11/1992 | Légaré ..................... 362/153.1 |
| 5,230,556 A | 7/1993 | Canty et al. |
| 5,274,350 A | 12/1993 | Larson |
| 5,276,385 A | 1/1994 | Itoh et al. |
| 5,343,121 A | 8/1994 | Terman et al. ................ 315/158 |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. ................ 315/360 |
| 5,808,294 A | 9/1998 | Neumann |
| 5,948,829 A * | 9/1999 | Wallajapet et al. ............. 521/64 |
| 6,094,919 A | 8/2000 | Bhatia .............................. 62/3.7 |
| 6,111,739 A | 8/2000 | Wu et al. ....................... 361/106 |
| 6,149,283 A * | 11/2000 | Conway et al. ................ 362/236 |
| 6,230,497 B1 | 5/2001 | Morris et al. ..................... 62/3.7 |
| 6,377,191 B1 | 4/2002 | Takubo |
| 6,400,101 B1 | 6/2002 | Biebl et al. |
| 6,499,860 B2 * | 12/2002 | Begemann .................... 362/230 |
| 6,601,972 B2 | 8/2003 | Sei et al. ....................... 362/236 |
| 6,612,720 B1 | 9/2003 | Beadle |
| 6,674,060 B2 | 1/2004 | Antila |
| 6,753,842 B1 | 6/2004 | Williams et al. |
| 6,828,911 B2 | 12/2004 | Jones et al. |
| 6,841,947 B2 | 1/2005 | Berg-johansen |
| 6,847,156 B2 | 1/2005 | Kim |
| 6,885,134 B2 | 4/2005 | Kurashima et al. ............. 313/46 |
| 6,902,292 B2 | 6/2005 | Lai |
| 6,948,829 B2 * | 9/2005 | Verdes et al. .................. 362/227 |
| 6,964,501 B2 * | 11/2005 | Ryan ............................. 362/294 |
| 7,019,276 B2 | 3/2006 | Cloutier et al. |
| 7,066,622 B2 | 6/2006 | Alessio |
| 7,081,722 B1 | 7/2006 | Huynh et al. |
| 7,111,961 B2 * | 9/2006 | Trenchard et al. ............. 362/235 |
| 7,122,976 B1 | 10/2006 | Null et al. ...................... 315/362 |
| 7,144,140 B2 | 12/2006 | Sun et al. ...................... 362/373 |
| 7,145,179 B2 | 12/2006 | Petroski |
| 7,165,866 B2 * | 1/2007 | Li ................................. 362/294 |
| 7,188,967 B2 | 3/2007 | Dalton et al. |
| 7,213,940 B1 | 5/2007 | Van De Ven et al. ......... 362/231 |
| 7,239,087 B2 | 7/2007 | Ball ............................... 315/128 |
| 7,252,385 B2 | 8/2007 | Engle et al. ..................... 353/52 |
| 7,281,820 B2 | 10/2007 | Bayat et al. |
| 7,314,261 B2 | 1/2008 | Jackson Pulver et al. ........ 347/9 |
| 7,317,403 B2 | 1/2008 | Grootes et al. ........... 340/815.45 |
| 7,330,002 B2 | 2/2008 | Joung ........................... 315/309 |
| 7,330,568 B2 | 2/2008 | Nagaoka et al. |
| 7,339,323 B2 | 3/2008 | Bucur ........................... 315/128 |
| 7,339,471 B1 | 3/2008 | Chan et al. .................... 340/541 |
| 7,341,362 B2 | 3/2008 | Bjornson et al. .............. 362/294 |
| 7,387,403 B2 * | 6/2008 | Mighetto ....................... 362/218 |
| 7,405,524 B2 | 7/2008 | Null et al. |
| 7,438,440 B2 | 10/2008 | Dorogi ........................... 362/294 |
| 7,458,330 B2 | 12/2008 | MacDonald et al. .......... 114/177 |
| 7,461,964 B1 * | 12/2008 | Aubrey .......................... 362/647 |
| 7,468,723 B1 | 12/2008 | Collins |
| 7,475,002 B1 | 1/2009 | Mann .............................. 703/23 |
| 7,524,089 B2 | 4/2009 | Park .............................. 362/294 |
| 7,549,773 B2 * | 6/2009 | Lim ............................... 362/294 |
| 7,556,406 B2 | 7/2009 | Petroski et al. ............... 362/294 |
| 7,559,674 B2 * | 7/2009 | He et al. .................... 362/249.02 |
| 7,564,198 B2 | 7/2009 | Yamamoto et al. |
| 7,578,596 B2 | 8/2009 | Martin |
| 7,595,595 B2 | 9/2009 | Mehta |
| 7,626,342 B2 | 12/2009 | Sun et al. ...................... 315/247 |
| 7,627,372 B2 | 12/2009 | Vaisnys et al. |
| 7,635,203 B2 | 12/2009 | Weaver, Jr. et al. |
| 7,637,633 B2 | 12/2009 | Wong ............................ 362/294 |
| 7,677,753 B1 | 3/2010 | Wills |
| 7,688,002 B2 | 3/2010 | Ashdown et al. |
| 7,688,222 B2 | 3/2010 | Peddie et al. |
| 7,695,160 B2 | 4/2010 | Hirata et al. .................. 362/264 |
| 7,766,507 B2 | 8/2010 | Nakajima |
| 7,804,200 B2 | 9/2010 | Flaherty |
| 7,834,922 B2 | 11/2010 | Kurane |
| 7,874,699 B2 * | 1/2011 | Liang ....................... 362/249.02 |
| 7,874,710 B2 * | 1/2011 | Tsai et al. ..................... 362/373 |
| 7,901,107 B2 | 3/2011 | Van De Ven et al. ......... 362/231 |
| 7,940,191 B2 | 5/2011 | Hierzer |
| 7,952,609 B2 | 5/2011 | Simerly et al. |
| 8,018,135 B2 * | 9/2011 | Van De Ven et al. ......... 313/498 |
| 8,174,212 B2 | 5/2012 | Tziony et al. |
| 8,186,855 B2 * | 5/2012 | Wassel et al. .................. 362/373 |
| 8,254,137 B2 | 8/2012 | Wilkolaski et al. |
| 8,324,641 B2 | 12/2012 | Yan et al. |
| 2001/0014019 A1 * | 8/2001 | Begemann .................... 362/231 |
| 2003/0123521 A1 | 7/2003 | Luoma |
| 2003/0184672 A1 | 10/2003 | Wu et al. |
| 2004/0066142 A1 * | 4/2004 | Stimac et al. .................. 315/50 |
| 2004/0095772 A1 | 5/2004 | Hoover et al. ................ 362/363 |
| 2004/0105264 A1 * | 6/2004 | Spero ............................ 362/276 |
| 2004/0120148 A1 | 6/2004 | Morris et al. ................. 362/264 |
| 2004/0120156 A1 | 6/2004 | Ryan |
| 2004/0192227 A1 | 9/2004 | Beach et al. |
| 2005/0057187 A1 * | 3/2005 | Catalano ....................... 315/291 |
| 2005/0135101 A1 | 6/2005 | Richmond .................... 362/276 |
| 2005/0146884 A1 | 7/2005 | Scheithauer |
| 2005/0174780 A1 * | 8/2005 | Park .............................. 362/294 |
| 2005/0243022 A1 | 11/2005 | Negru ............................. 345/46 |
| 2005/0254013 A1 | 11/2005 | Engle et al. ..................... 353/52 |
| 2005/0265019 A1 | 12/2005 | Sommers et al. |
| 2006/0001384 A1 | 1/2006 | Tain et al. ..................... 315/246 |
| 2006/0014118 A1 | 1/2006 | Utama .......................... 433/31 |
| 2006/0056172 A1 | 3/2006 | Fiene ............................ 362/147 |
| 2006/0066264 A1 | 3/2006 | Ishigaki et al. |
| 2006/0098440 A1 * | 5/2006 | Allen ............................. 362/294 |
| 2006/0158130 A1 | 7/2006 | Furukawa ................. 315/200 R |
| 2006/0202914 A1 | 9/2006 | Ashdown ....................... 345/46 |
| 2006/0262544 A1 * | 11/2006 | Piepgras et al. .............. 362/373 |
| 2006/0277823 A1 | 12/2006 | Barnett et al. .................... 47/33 |
| 2007/0032990 A1 | 2/2007 | Williams et al. |
| 2007/0096118 A1 | 5/2007 | Mahalingam et al. .......... 257/81 |
| 2007/0102033 A1 | 5/2007 | Petrocy ......................... 136/203 |
| 2007/0139961 A1 | 6/2007 | Cheah et al. |
| 2007/0147046 A1 * | 6/2007 | Arik et al. ..................... 362/294 |
| 2007/0183156 A1 | 8/2007 | Shan |
| 2007/0225933 A1 | 9/2007 | Shimomura |
| 2007/0230183 A1 | 10/2007 | Shuy ............................. 362/294 |
| 2007/0247853 A1 | 10/2007 | Dorogi .......................... 362/294 |
| 2007/0279921 A1 | 12/2007 | Alexander et al. ............ 362/368 |
| 2007/0285920 A1 | 12/2007 | Seabrook ...................... 362/240 |
| 2007/0297184 A1 | 12/2007 | Isely |
| 2008/0018261 A1 | 1/2008 | Kastner |
| 2008/0043106 A1 | 2/2008 | Hassapis et al. |
| 2008/0106907 A1 | 5/2008 | Trott et al. |
| 2008/0130298 A1 * | 6/2008 | Negley et al. ................. 362/365 |
| 2008/0130304 A1 | 6/2008 | Rash et al. |
| 2008/0232119 A1 * | 9/2008 | Ribarich ....................... 362/373 |
| 2008/0253125 A1 * | 10/2008 | Kang et al. .................... 362/294 |
| 2008/0266839 A1 | 10/2008 | Claypool et al. |
| 2008/0271065 A1 | 10/2008 | Buonasera et al. ............. 725/10 |
| 2008/0298058 A1 | 12/2008 | Kan et al. |
| 2008/0309240 A1 | 12/2008 | Goray et al. .................... 315/56 |
| 2009/0001372 A1 | 1/2009 | Arik et al. |
| 2009/0046151 A1 | 2/2009 | Nagaoka et al. |
| 2009/0109625 A1 * | 4/2009 | Booth et al. .................. 361/702 |
| 2009/0160358 A1 | 6/2009 | Leiderman |
| 2009/0161356 A1 * | 6/2009 | Negley et al. ................. 362/231 |
| 2009/0167203 A1 | 7/2009 | Dahlman et al. |
| 2009/0225540 A1 | 9/2009 | Chen |
| 2009/0230883 A1 | 9/2009 | Haug |
| 2009/0235208 A1 | 9/2009 | Nakayama et al. |
| 2009/0244899 A1 * | 10/2009 | Chyn ............................. 362/294 |
| 2009/0261735 A1 | 10/2009 | Sibalich et al. |
| 2009/0268023 A1 | 10/2009 | Hsieh |
| 2009/0278474 A1 | 11/2009 | Reed et al. .................... 315/294 |
| 2009/0278479 A1 * | 11/2009 | Platner et al. ................. 315/312 |
| 2009/0284155 A1 | 11/2009 | Reed et al. ...................... 315/32 |
| 2009/0315485 A1 | 12/2009 | Verfuerth et al. |
| 2010/0008090 A1 | 1/2010 | Li et al. |
| 2010/0052557 A1 | 3/2010 | Van Der Veen et al. |
| 2010/0053962 A1 | 3/2010 | Mo et al. |

(56) References Cited

U.S. PATENT DOCUMENTS

| | | | |
|---|---|---|---|
| 2010/0060130 A1* | 3/2010 | Li | 313/46 |
| 2010/0084979 A1 | 4/2010 | Burton et al. | |
| 2010/0090577 A1 | 4/2010 | Reed et al. | 313/46 |
| 2010/0096460 A1 | 4/2010 | Carlson et al. | |
| 2010/0123403 A1 | 5/2010 | Reed | 315/193 |
| 2010/0171442 A1 | 7/2010 | Draper et al. | |
| 2010/0177519 A1* | 7/2010 | Schlitz | 362/294 |
| 2010/0259193 A1 | 10/2010 | Umezawa et al. | |
| 2010/0271802 A1 | 10/2010 | Recker et al. | |
| 2010/0277914 A1 | 11/2010 | Bachl et al. | |
| 2010/0277917 A1 | 11/2010 | Shan | |
| 2010/0290236 A1 | 11/2010 | Gingrich, III et al. | |
| 2010/0295454 A1 | 11/2010 | Reed | 315/152 |
| 2010/0295455 A1 | 11/2010 | Reed | 315/152 |
| 2010/0295946 A1 | 11/2010 | Reed et al. | 348/164 |
| 2010/0309310 A1 | 12/2010 | Albright | |
| 2010/0328947 A1 | 12/2010 | Chang et al. | |
| 2011/0001626 A1 | 1/2011 | Yip et al. | |
| 2011/0006703 A1 | 1/2011 | Wu et al. | |
| 2011/0175518 A1 | 7/2011 | Reed et al. | |
| 2011/0221346 A1 | 9/2011 | Lee et al. | |
| 2011/0251751 A1 | 10/2011 | Knight | |
| 2011/0310605 A1 | 12/2011 | Renn et al. | |
| 2012/0001566 A1 | 1/2012 | Josefowicz et al. | |
| 2012/0169053 A1 | 7/2012 | Tchoryk, Jr. et al. | |
| 2012/0221154 A1 | 8/2012 | Runge | |
| 2012/0262069 A1 | 10/2012 | Reed | |
| 2013/0043792 A1 | 2/2013 | Reed | |
| 2013/0049613 A1 | 2/2013 | Reed | |
| 2013/0141000 A1 | 6/2013 | Wei et al. | |
| 2013/0141010 A1 | 6/2013 | Reed et al. | |
| 2013/0163243 A1 | 6/2013 | Reed | |
| 2013/0229518 A1 | 9/2013 | Reed et al. | |
| 2013/0235202 A1 | 9/2013 | Nagaoka et al. | |
| 2013/0340353 A1 | 12/2013 | Whiting et al. | |

FOREIGN PATENT DOCUMENTS

| | | |
|---|---|---|
| EP | 1 734 795 | 12/2006 |
| FR | 2 883 306 | 9/2006 |
| JP | 6-335241 A | 12/1994 |
| JP | 2001-333420 | 11/2001 |
| JP | 2004-279668 A | 10/2004 |
| JP | 2004/349065 | 12/2004 |
| JP | 2005-93171 A | 4/2005 |
| JP | 2005-198238 A | 7/2005 |
| JP | 2005-310997 A | 11/2005 |
| JP | 2006-31977 A | 2/2006 |
| JP | 2006-179672 A | 7/2006 |
| JP | 2006/244711 | 9/2006 |
| JP | 2008-509538 A | 3/2008 |
| JP | 2008-130523 A | 6/2008 |
| JP | 2008-159483 A | 7/2008 |
| JP | 2008-177144 A | 7/2008 |
| KR | 10-2005-0078403 A | 8/2005 |
| KR | 10-2006-0086254 A | 7/2006 |
| KR | 10-2008-0094344 A | 10/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 | 9/2002 |
| WO | 03/056882 | 7/2003 |
| WO | 2006/057866 | 6/2006 |
| WO | 2007/023454 A1 | 3/2007 |
| WO | 2007/036873 | 4/2007 |
| WO | 2008/030450 | 3/2008 |
| WO | 2008/034242 A1 | 3/2008 |
| WO | 2009/040703 | 4/2009 |
| WO | 2012/006710 A1 | 1/2012 |
| WO | 2012/142115 A2 | 10/2012 |
| WO | 2014/018773 A1 | 1/2014 |
| WO | 2014/039683 A1 | 3/2014 |

OTHER PUBLICATIONS

Reed, "Apparatus and Method of Energy Efficient Illumination," U.S. Appl. No. 61/346,263, filed May 19, 2010, 67 pages.

International Search Report, mailed Oct. 8, 2012 for PCT/US2012/033059, 3 pages.

Written Opinion, mailed Oct. 8, 2012 for PCT/US2012/033059, 3 pages.

Reed et al., "Gas-Discharge Lamp Replacement," Office Action mailed Nov. 17, 2011 for U.S. Appl. No. 12/437,467, 15 pages.

Reed et al., "Turbulent Flow Cooling for Electronic Ballast," Office Action mailed Jan. 5, 2012 for U.S. Appl. No. 12/540,250, 12 pages.

Reed et al., "Low-Profile Pathway Illumination System," U.S. Appl. No. 61/051,619, filed May 8, 2008, 25 pages.

Reed et al., "Gas-Discharge Lamp Replacement," U.S. Appl. No. 61/052,924, filed May 13, 2008, 32 pages.

Reed et al., "Turbulent Flow Cooling for Electronic Ballast," U.S. Appl. No. 61/088,651, filed Aug. 13, 2008, 23 pages.

Reed, "Electronic Control to Regulate Power for Solid-State Lighting and Methods Thereof," U.S. Appl. No. 61/115,438, filed Nov. 17, 2008, 51 pages.

Reed, "Electronic Control to Regulate Power for Solid-State Lighting and Methods Thereof," U.S. Appl. No. 61/154,619, filed Feb. 23, 2009, 62 pages.

Reed et al., "Gas-Discharge Lamp Replacement with Passive Cooling," U.S. Appl. No. 61/174,913, filed May 1, 2009, 29 pages.

Reed et al., "Long-Range Motion Detection for Illumination Control," U.S. Appl. No. 61/180,017, filed May 20, 2009, 32 pages.

Reed et al., "Electrically Isolated Heat Sink for Solid-State Light," U.S. Appl. No. 12/846,516, filed Jul. 29, 2010, 29 pages.

International Search Report, mailed Jul. 9, 2009 for PCT/US2009/043171, 3 pages.

Written Opinion, mailed Jul. 9, 2009 for PCT/US2009/043171, 8 pages.

International Search Report, mailed Jun. 21, 2010 for PCT/US2009/064625, 3 pages.

Written Opinion, mailed Jun. 21, 2010 for PCT/US2009/064625, 5 pages.

International Search Report, mailed Jun. 10, 2009 for PCT/US2009/043170, 4 pages.

Written Opinion, mailed Jun. 10, 2009 for PCT/US2009/043170, 7 pages.

International Search Report, mailed Nov. 29, 2010 for PCT/US2010/033000, 3 pages.

Written Opinion, mailed Nov. 29, 2010 for PCT/US2010/033000, 5 pages.

International Search Report, mailed Dec. 13, 2010 for PCT/US2010/035649, 3 pages.

Written Opinion, mailed Dec. 13, 2010 for PCT/US2010/035649, 4 pages.

International Search Report, mailed Dec. 28, 2010 for PCT/US2010/035651, 3 pages.

Written Opinion, mailed Dec. 28, 2010 for PCT/US2010/035651, 3 pages.

International Search Report, mailed Dec. 15, 2010 for PCT/US2010/035658, 3 pages.

Written Opinion, mailed Dec. 15, 2010 for PCT/US2010/035658, 3 pages.

Reed et al., "Turbulent Flow Cooling for Electronic Ballast," Office Action mailed Dec. 29, 2010 for U.S. Appl. No. 12/540,250, 16 pages.

Reed et al., "Electrically Isolated Heat Sink for Solid-State Light," U.S. Appl. No. 61/229,435, filed Jul. 29, 2009, 29 pages.

Reed et al., "Apparatus, Method to Change Light Source Color Temperature with Reduced Optical Filtering Losses," U.S. Appl. No. 61/295,519, filed Jan. 15, 2010, 35 pages.

Renn et al., "Solid State Lighting Device and Method Employing Heat Exchanger Thermally Coupled Circuit Board," U.S. Appl. No. 61/357,421, filed Jun. 22, 2010, 49 pages.

(56) References Cited

OTHER PUBLICATIONS

"A Review of the Literature on Light Flicker: Ergonomics, Biological Attributes, Potential Health Effects, and Methods in Which Some LED Lighting May Introduce Flicker," IEEE Standard P1789, Feb. 26, 2010, 26 pages.

International Search Report, mailed Sep. 29, 2011 for PCT/US2011/041402, 3 pages.

Reed et al., "Gas-Discharge Lamp Replacement," Amendment filed Sep. 6, 2011 for U.S. Appl. No. 12/437,467, 14 pages.

Reed et al., "Gas-Discharge Lamp Replacement," Office Action mailed Jun. 22, 2011 for U.S. Appl. No. 12/437,467, 12 pages.

Reed et al., "Turbulent Flow Cooling for Electronic Ballast," Amendment filed Apr. 29, 2011 for U.S. Appl. No. 12/540,250, 11 pages.

Reed et al., "Turbulent Flow Cooling for Electronic Ballast," Amendment filed Oct. 14, 2011 for U.S. Appl. No. 12/540,250, 12 pages.

Reed et al., "Turbulent Flow Cooling for Electronic Ballast," Office Action mailed Jul. 20, 2011 for U.S. Appl. No. 12/540,250, 15 pages.

Written Opinion, mailed Sep. 29, 2011 for PCT/US2011/041402, 4 pages.

International Search Report, mailed Feb. 27, 2013, for PCT/US2012/065476, 3 pages.

International Search Report, mailed Jan. 14, 2013, for PCT/US2012/052009, 3 pages.

International Search Report, mailed Sep. 30, 2011, for PCT/US2011/021359, 3 pages.

Reed, "Electronic Control to Regulate Power for Solid-State Lighting and Methods Thereof," Office Action mailed Feb. 28, 2013, for U.S. Appl. No. 12/619,535, 17 pages.

Reed, "Electronic Control to Regulate Power for Solid-State Lighting and Methods Thereof," Amendment filed May 24, 2013, for U.S. Appl. No. 12/619,535, 21 pages.

Reed, "Electronic Control to Regulate Power for Solid-State Lighting and Methods Thereof," Office Action mailed Jul. 30, 2013, for U.S. Appl. No. 12/619,535, 15 pages.

Reed et al., "Gas-Discharge Lamp Replacement," Amendment filed Apr. 10, 2012, for U.S. Appl. No. 12/437,467, 22 pages.

Reed et al., "Gas-Discharge Lamp Replacement," Amendment filed Sep. 7, 2012, for U.S. Appl. No. 12/437,467, 9 pages.

Reed et al., "Gas-Discharge Lamp Replacement," Office Action mailed Jan. 17, 2013, for U.S. Appl. No. 12/437,467, 12 pages.

Reed et al., "Gas-Discharge Lamp Replacement," Office Action mailed Jun. 12, 2012, for U.S. Appl. No. 12/437,467, 17 pages.

Reed et al., "Gas-Discharge Lamp Replacement," Office Action mailed Jun. 26, 2013, for U.S. Appl. No. 12/437,467, 15 pages.

Reed et al., "Gas-Discharge Lamp Replacement," Amendment filed Sep. 26, 2013, for U.S. Appl. No. 12/437,467, 20 pages.

Reed et al., "Long-Range Motion Detection for Illumination Control," Office Action mailed Dec. 21, 2012, for U.S. Appl. No. 12/784,080, 26 pages.

Reed et al., "Long-Range Motion Detection for Illumination Control," Amendment filed Apr. 22, 2013, for U.S. Appl. No. 12/784,080, 17 pages.

Reed et al., "Long-Range Motion Detection for Illumination Control," Office Action mailed Jul. 22, 2013, for U.S. Appl. No. 12/784,080, 29 pages.

Reed et al., "Long-Range Motion Detection for Illumination Control," Amendment filed Sep. 27, 2013, for U.S. Appl. No. 12/784,080, 20 pages.

Reed et al., "Electrically Isolated Heat Sink for Solid-State Light," Office Action mailed Apr. 4, 2013, for U.S. Appl. No. 12/846,516, 12 pages.

Reed et al., "Electrically Isolated Heat Sink for Solid-State Light," Office Action mailed Oct. 12, 2012, for U.S. Appl. No. 12/846,516, 11 pages.

Reed et al., "Electrically Isolated Heat Sink for Solid-State Light," Amendment filed Jan. 14, 2013, for U.S. Appl. No. 12/846,516, 16 pages.

Reed et al., "Turbulent Flow Cooling for Electronic Ballast," Notice of Allowance mailed Aug. 15, 2012, for U.S. Appl. No. 12/540,250, 7 pages.

Reed et al., "Turbulent Flow Cooling for Electronic Ballast," Amendment filed Apr. 5, 2012, for U.S. Appl. No. 12/540,250, 8 pages.

Reed, "Apparatus and Method of Energy Efficient Illumination Using Received Signals," Office Action mailed Oct. 1, 2013, for U.S. Appl. No. 13/085,301, 11 pages.

Reed, "Luminaire With Atmospheric Electrical Activity Detection and Visual Alert Capabilities," U.S. Appl. No. 13/786,114, filed Mar. 5, 2013, 52 pages.

Reed, "Photocontrol for Luminaire Consumes Very Low Power," U.S. Appl. No. 13/950,201, filed Jul. 24, 2013, 41 pages.

Reed, "Resonant Network for Reduction of Flicker Perception in Solid State Lighting Systems," Notice of Allowance mailed Sep. 30, 2013, for U.S. Appl. No. 13/592,590, 9 pages.

Reed, "Apparatus and Method of Energy Efficient Illumination," Amendment filed Apr. 2, 2013, for U.S. Appl. No. 12/784,093, 13 pages.

Reed, "Apparatus and Method of Energy Efficient Illumination," Notice of Allowance mailed Apr. 12, 2013, for U.S. Appl. No. 12/784,093, 9 pages.

Reed, "Apparatus and Method of Energy Efficient Illumination," Office Action mailed Dec. 5, 2012, for U.S. Appl. No. 12/784,093, 13 pages.

Reed, "Apparatus and Method of Energy Efficient Illumination," Amendment filed Apr. 4, 2013, for U.S. Appl. No. 12/784,091, 15 pages.

Reed, "Apparatus and Method of Energy Efficient Illumination," Office Action mailed Apr. 24, 2013, for U.S. Appl. No. 12/784,091, 12 pages.

Reed, "Apparatus and Method of Energy Efficient Illumination," Amendment filed May 14, 2013, for U.S. Appl. No. 12/784,091, 9 pages.

Reed, "Apparatus and Method of Energy Efficient Illumination," Notice of Allowance mailed May 23, 2013, for U.S. Appl. No. 12/784,091, 6 pages.

Reed, "Apparatus and Method of Energy Efficient Illumination," Office Action mailed Dec. 5, 2012, for U.S. Appl. No. 12/784,091, 18 pages.

Reed, "Electrostatic Discharge Protection for Luminaire," Office Action mailed Mar. 15, 2013, for U.S. Appl. No. 13/212,074, 11 pages.

Reed, "Electrostatic Discharge Protection for Luminaire," Amendment filed Jun. 17, 2013, for U.S. Appl. No. 13/212,074, 11 pages.

Reed, "Electrostatic Discharge Protection for Luminaire," Notice of Allowance mailed Sep. 12, 2013, for U.S. Appl. No. 13/212,074, 6 pages.

Reed, "Luminaire With Ambient Sensing and Autonomous Control Capabilities," U.S. Appl. No. 13/786,332, filed Mar. 5, 2013, 86 pages Renn et al., "Solid State Lighting Device and Method Employing Heat Exchanger Thermally Coupled Circuit Board," Office Action mailed Apr. 29, 2013, for U.S. Appl. No. 13/166,626, 19 pages.

Renn et al., "Solid State Lighting Device and Method Employing Heat Exchanger Thermally Coupled Circuit Board," Amendment filed Sep. 24, 2013, for U.S. Appl. No. 13/166,626, 19 pages.

Written Opinion, mailed Sep. 30, 2011, for PCT/US2011/021359, 3 pages.

Written Opinion, mailed Feb. 27, 2013, for PCT/US2012/065476, 8 pages.

Written Opinion, mailed Jan. 14, 2013, for PCT/US2012/052009, 5 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.

Kadirvel et al., "Self-Powered, Ambient Light Sensor Using bq25504," Texas Instruments, Application Report, SLUA629—Jan. 2012, 6 pages.

Reed et al., "Adjustable Output Solid-State Lamp With Security Features," U.S. Appl. No. 61/561,616, filed Nov. 18, 2011, 33 pages.

(56) References Cited

OTHER PUBLICATIONS

Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," U.S. Appl. No. 13/943,537, filed Jul. 16, 2013, 67 pages.
Reed, "Electronic Control to Regulate Power for Solid-State Lighting and Methods Thereof," Amendment filed Oct. 30, 2013, for U.S. Appl. No. 12/619,535, 5 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
International Search Report, mailed Nov. 19, 2013 for PCT/US2013/052092, 4 pages.
International Search Report, mailed Dec. 30, 2013 for PCT/US2013/058266, 3 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Office Action mailed Feb. 27, 2014, for U.S. Appl. No. 13/679,687, 11 pages.
Reed et al., "Gas-Discharge Lamp Replacement," Office Action mailed Jan. 30, 2014, for U.S. Appl. No. 12/437,467, 17 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "Photocontrol for Luminaire Consumes Very Low Power," U.S. Appl. No. 61/849,841, filed Jul. 24, 2013, 41 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.

Renn et al., "Solid State Lighting Device and Method Employing Heat Exchanger Thermally Coupled Circuit Board," Office Action mailed Jan. 14, 2014, for U.S. Appl. No. 13/166,626, 19 pages.
Renn et al., "Solid State Lighting Device and Method Employing Heat Exchanger Thermally Coupled Circuit Board," Amendment filed Mar. 11, 2014, for U.S. Appl. No. 13/166,626, 24 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
Littelfuse, "Application Note: Protecting LEDs in Product Designs," 2009, 2 pages.
Panasonic Electronic Components, "LED Lighting Solutions," 2009, 6 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Reed, "Apparatus and Method of Energy Efficient Illumination Using Received Signals," U.S. Appl. No. 13/085,301, filed Apr. 12, 2011, 99 pages.
Reed, "Electrostatic Discharge Protection for Luminaire," U.S. Appl. No. 13/212,074, filed Aug. 17, 2011, 30 pages.
Reed, "Resonant Network for Reduction of Flicker Perception in Solid State Lighting Systems," U.S. Appl. No. 61/527,029, filed Aug. 24, 2011, 41 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Apparatus and Method of Operating a Luminaire," U.S. Appl. No. 13/558,191, filed Jul. 25, 2012, 84 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Notice of Allowance, dated Oct. 14, 2011, for U.S. Appl. No. 12/437,472, 9 pages.
Reed et al., "Systems and Methods That Employ Object Recognition," U.S. Appl. No. 13/411,321, filed Mar. 2, 2012, 51 pages.
Reed et al., "Apparatus and Method for Schedule Based Operation of a Luminaire" U.S. Appl. No. 13/604,327, filed Sep. 5, 2012, 44 pages.
Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Gas-Discharge Lamp Replacement," Notice of Allowance mailed Sep. 3, 2014, for U.S. Appl. No. 12/437,467, 8 pages.
Reed et al., "Long-Range Motion Detection for Illumination Control," Notice Of Allowance mailed Jun. 20, 2014, for U.S. Appl. No. 12/784,080, 7 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.

(56) References Cited

OTHER PUBLICATIONS

Reed, "Apparatus and Method of Energy Efficient Illumination Using Received Signals," Notice of Allowance mailed Jul. 30, 2014, for U.S. Appl. No. 13/085,301, 5 pages.

Reed, "Luminaire With Atmospheric Electrical Activity Detection and Visual Alert Capabilities," Notice Of Allowance mailed Jul. 1, 2014, for U.S. Appl. No. 13/786,114, 9 pages.

* cited by examiner

GAS-DISCHARGE LAMP REPLACEMENT WITH PASSIVE COOLING

CROSS REFERENCE TO RELATED APPLICATIONS

This application claims benefit under 35 U.S.C. 119(e) of U.S. Provisional Patent Application Ser. No. 61/174,913, filed May 1, 2009 and entitled "GAS-DISCHARGE LAMP REPLACEMENT with passive cooling," which is incorporated herein by reference in its entirety.

BACKGROUND

1. Technical Field

This disclosure generally relates to illumination devices and more particularly to illumination devices to retrofit light fixtures as a replacement of gas-discharge lamps.

2. Description of the Related Art

Gas-discharge lamps are a family of artificial light sources that generate light by sending an electrical discharge through an ionized gas. Mercury-vapor lamps, a type of gas-discharge lamps and commonly referred to as "security lights", use mercury in an excited state to produce light. The Energy Conservation Act of 2005 bans the manufacture and importation of mercury-vapor ballasts and luminaires. As a result, new ballasts for mercury-vapor type of luminaires are limited to the quantity of ballasts still existing in the inventory of manufacturers, distributors, and retail sales stores. Nevertheless, mercury-vapor bulbs can still be manufactured and imported in order to support the existing installed bases of luminaires of this type.

One reason for banning the manufacturing and importation of mercury-vapor lamp ballasts was that the combination of mercury-vapor ballasts and mercury-vapor bulbs results in energy inefficiency as well as a very low power factor. Power factor in an alternating-current (AC) electrical system is defined as the ratio of the "true power" to the "apparent power", and is a number between 0 and 1. True power is the power dissipated by the luminaire. Apparent power is the total power that must be supplied to the luminaire including the power stored and returned to the power grid due to reactive components in the luminaire. Mercury-vapor lamps typically have a power factor of about 0.35 pf.

Additionally, mercury-vapor lamps emit light with a low color rendering index (CRI). For reference, sunlight has a CRI of 100 and represents "ideal light" in that it contains a continuous spectrum of visible radiation making all colors of an illuminated surface perceptible to the human eye. Light with a low CRI is less useful because illuminated surfaces are not all perceived as their true color. Light with a low CRI is also less pleasing to the eye, and less useful for discrimination of an illuminated scene. Mercury-vapor lamps have, on average, a very low CRI of approximately 35.

Another concern with mercury-vapor lamps is the long warm-up time required to achieve full output. The long startup time prohibits the effective use of motion-detecting sensors to automatically turn mercury-vapor luminaires ON when people, animals or other objects are present. For this reason, mercury-vapor luminaires are typically turned ON with an ambient light sensor that is triggered by the low level of light after sunset, and then left on all night. This is a very wasteful solution to the warm-up time problem which consumes large amounts of energy when no light is needed.

A mercury-vapor lamp typically has much higher energy consumption during the warm-up time than during normal operation. As much as 10 times the usual amount of current for normal operation is required during warm-up than normal operation. This can require expensive overdesign of the electrical wiring, especially when multiple mercury-vapor lamps may turn ON at the same time. For example, a load comprised of ten 175-Watt luminaires might consume 17,000 watts when turned ON within the warm-up times of the lamps.

Moreover, typical mercury-vapor luminaires have an optical design which results in as much as 40% of the emitted light escaping upward. This light and the energy consumed to produce such light are wasted because the escaping light is not directed toward the areas the luminaires are intended to illuminate. The upward escaping light is a source of "light trespass," illuminating areas where the illumination is not desired. For example, such light pollutes the sky, causing problems for astronomers and others who wish to view the night sky.

Furthermore, mercury is a very toxic metal that contaminates landfills and water supplies when not disposed of properly, or when a mercury-vapor lamp is accidentally broken. Mercury is a restricted material and controlled by statute in most developed countries. Consequently, mercury-vapor lamps are expensive and troublesome to dispose of at end of life.

Other types of gas-discharge lamps, including high-pressure sodium-vapor lamps and metal halide lamps, have been developed to address some of the aforementioned problems. High-pressure sodium-vapor lamps are somewhat more energy efficient than mercury-vapor lamps, but still suffer from poor CRI and also contain mercury. Metal halide lamps are not commonly available to work with mercury-vapor lamp ballasts, and typically require a higher ignition voltage to start. Both high-pressure sodium-vapor lamps and metal halide lamps have similar warm-up and cool-down characteristics as mercury-vapor lamps. Neither corrects for the poor optical design of the security light luminaires. Both alternative types of lamps have poor power factors. Thus, none of these alternative gas-discharge lamps can serve as an ideal replacement of mercury-vapor lamps to fully address the aforementioned problems associated with mercury-vapor lamps.

Solid-state lighting, such as Light-emitting diode (LED) lighting, has been shown to be an energy-efficient alternative to gas-discharge lamps, and in general also tends to have longer service life than typical gas-discharge lamps. Many utilities and consumers thus find it economically compelling to replace gas-discharge lamps with LED replacement lamps. Typical area lighting luminaires include a metal housing, an electrical ballast, a lamp socket, and removable cover/refractor. LED replacement lamps for these luminaires typically have some form of active cooling system to remove the excess heat generated by the LEDs. Such an active cooling system, however, constitutes additional costs to the replacement lamp and requires an unobstructed air path to operate. On the other hand, LED lamps without cooling have been shown to have shorter service life due to the high temperatures that result from operating the LED lamp in the enclosed space of the luminaire's cover/refractor.

BRIEF SUMMARY

In one aspect, an illumination device comprises a solid-state lighting device and a heat sink. The heat sink is configured to be attachable to a fixture for a gas-discharge lamp to retrofit existing gas-discharge fixtures. The heat sink is conductively thermally coupled to the solid-state lighting device to dissipate heat generated by the solid-state lighting device.

In another aspect, an illumination device includes a lighting device and a heat sink. The lighting device includes a lamp base that is receivable in a lamp socket of a fixture configured to receive a gas-discharge lamp to receive power through the lamp socket of the fixture. The heat sink has a first end physically attachable to the fixture and a second end conductively thermally coupled to the lighting device to dissipate heat generated by the lighting device.

An illumination device may be summarized as including a solid-state lighting device; and a heat sink configured to be attachable to a fixture for a gas-discharge lamp, the heat sink physically attached and conductively thermally coupled to the solid-state lighting device to dissipate heat generated by the solid-state lighting device. The heat sink may include a plurality of protrusions. The plurality of protrusions may include a plurality of fins having a total exposed surface area equal to or greater than an area of 30 square centimeters per Watt ($cm^2$/Watt) times a maximum Wattage rating of the lighting device, the total exposed surface area comprising a cumulative area of the surfaces of the fins that provide convective and/or radiative heat transfer. The solid-state lighting device may includes at least one light-emitting diode (LED); and a base plate on which the at least one LED is mounted. The heat sink may have a total exposed surface area sufficient to convectively and/or radiatively dissipate heat generated by the at least one LED to maintain a temperature on the base plate proximate where the at least one LED is located to be no more than 20 degrees Celsius (° C.) above an ambient temperature.

The solid-state lighting device may further include an electronic ballast to regulate electrical power supplied to the LED. The electronic ballast may include a switch-mode flyback current regulator.

The solid-state lighting device may further include a lamp base sized and dimensioned to be detachably received in a lamp socket of the fixture that is configured to receive a gas-discharge lamp, the lamp base to provide electrical power from power mains to the solid-state lighting device when received in the lamp socket that is electrically coupled to the power mains.

The solid-state lighting device may further include a light transmissive cover mountable to the base plate. The light transmissive cover may include at least one optical refractor that directs light emitted from the at least one LED into a National Electrical Manufacturers Association (NEMA) butterfly pattern. The light transmissive cover may be at least optically refractive or optically reflective.

The illumination device may further include a sensor switch device that senses an ambient characteristic indicative of a presence, the sensor switch device coupled to control operation of the solid-state lighting device based on the sensed ambient characteristic. The sensing device may include a motion activated sensor. The sensor switch device may include a passive infrared (PIR) detector. The sensor switch device may include a solid-state camera operable to capture images of an area over a period of time; and a controller coupled to process the captured images from the solid-state camera and control operation of the solid-state lighting device based on the captured images. The sensor switch device may control an intensity of illumination by the solid-state lighting device based on the sensed ambient characteristic.

An illumination device may be summarized as including a lighting device, the lighting device including a lamp base that is receivable in a lamp socket of a fixture configured to receive a gas-discharge lamp to receive power through the lamp socket of the fixture; and a heat sink having a first end physically attachable to the fixture and a second end conductively thermally coupled to the lighting device to dissipate heat generated by the lighting device. The lighting device may include a plurality of solid-state light emitters; and a base plate on which the solid-state light emitters are mounted, the base plate physically attachable to the heat sink to conductively transfer heat from the solid-state light emitter to the heat sink. The plurality of solid-state light emitters may include a plurality of light-emitting diodes (LEDs).

The lighting device may further include an electronic ballast that regulates power supplied to the solid-state light emitters. The heat sink may include at least one fastener to allow the heat sink to be detachably mounted on the fixture that is configured to receive a gas-discharge lamp. The heat sink may include a plurality of fins. The plurality of fins may include a plurality of die-cast fins. The plurality of fins may include a plurality of stamp metal plates. The heat sink may have a total exposed surface area equal to or greater than an area of 30 square centimeters per Watt ($cm^2$/Watt) times a maximum Wattage rating of the lighting device. The heat sink may have a total exposed surface area sufficient to dissipate heat generated by the lighting device to maintain a temperature on the base plate proximate the solid-state light emitter be no more than 20 degrees Celsius (° C.) above an ambient temperature.

The illumination device of claim may further include a control device controllingly coupled to the lighting device to control operation of the lighting device. The control device may include a motion sensor to detect motion. The control device may include a passive infrared (PIR) detector to detect heat. The control device may include a solid-state camera capturing images of an area; and a processor coupled to receive and process the captured images from the solid-state camera and filter coupled to control operation of the solid-state lighting device based on the captured images. The control device may control an intensity of illumination by the lighting device based on a sensed ambient characteristic.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting fixtures, luminaires and/or LED lighting have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1:
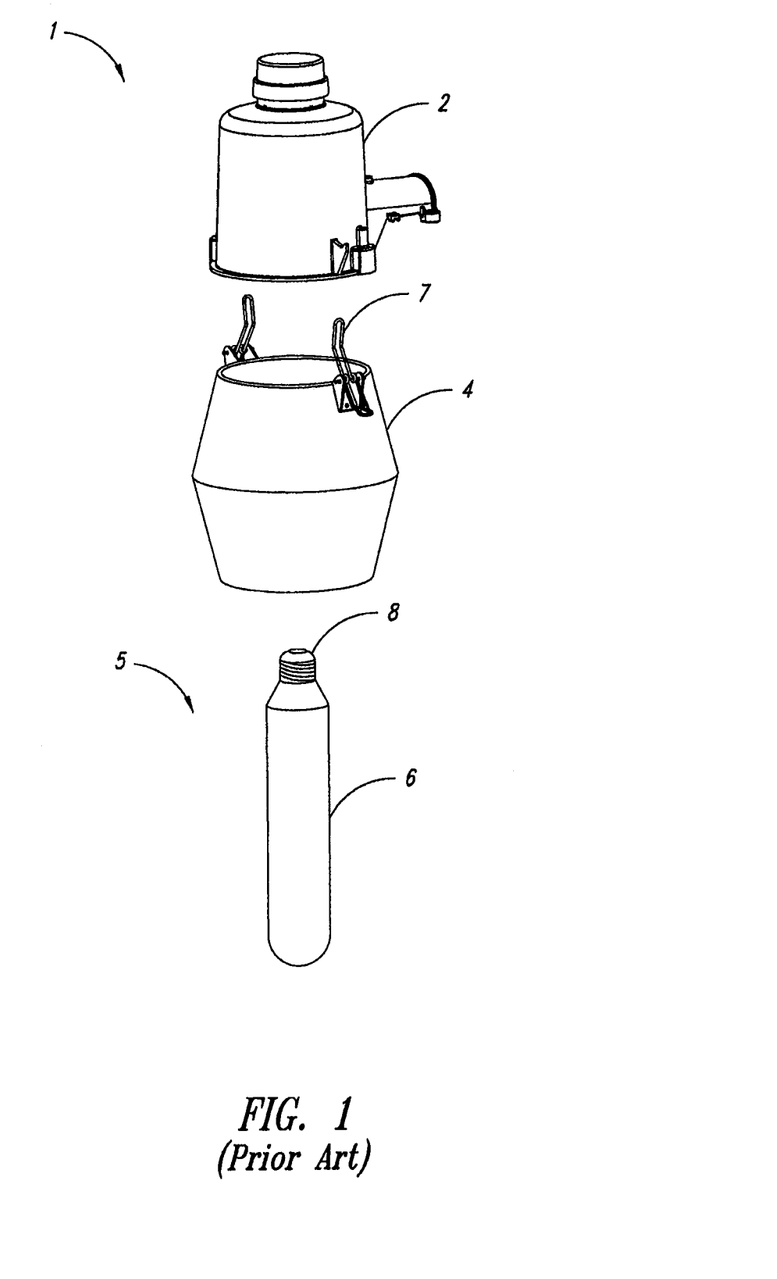
FIG. 1 is an assembly diagram showing a luminaire equipped with a gas-discharge lamp.

FIG. 1 shows a luminaire 1 equipped with a gas-discharge lamp 5. The luminaire 1 includes a light fixture 2 and a metal and plastic cover/refractor 4. Typically, the light fixture 2 is in conformance with the National Electrical Manufacturers Association (NEMA) standards, and the luminaire 1 is a luminaire of the NEMA 5 type. The cover/refractor 4 is attached to the light fixture 2, for example, by latches, screws, or nuts and bolts. As shown in FIG. 1, the cover/refractor 4 has "toggle" latches 7. The light fixture 2 is configured so that the luminaire 1 can be mounted to a structure such as a lamp post, wall, or the like, to provide lighting to an area such as a parking lot, garage, sidewalk, courtyard, barnyard lot, open field, etc. The light fixture 2 is typically connected to electrical power mains to provide electrical power for lighting. The light fixture 2 has a receptacle, such as a threaded lamp socket 3 (FIG. 5), into which a lamp or an illumination device is threadedly inserted to receive electrical power from the electrical power mains. The gas-discharge lamp 5, such as a mercury-vapor lamp for example, is typically used in the luminaire 1 to provide the lighting. The gas-discharge lamp 5 includes a bulb 6 and a threaded base 8. The gas-discharge lamp 5 is mounted to the light fixture 2 with the threaded base 8 of the gas-discharge lamp 5 inserted into the threaded lamp socket 3 of the light fixture 2.

Figure 2:
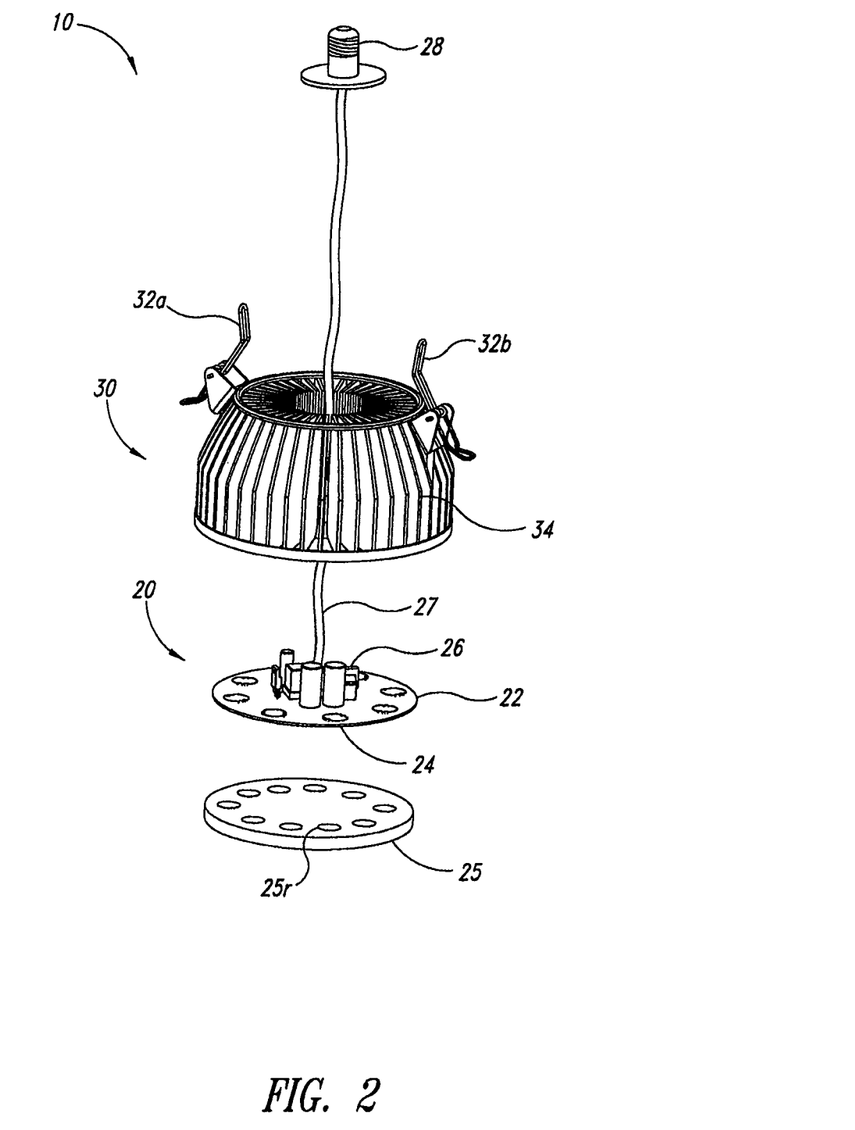
FIG. 2 is an assembly diagram showing an illumination device according to one non-limiting illustrated embodiment.

FIG. 2 shows the components of an illumination device 10 according to one embodiment.

Figure 5:
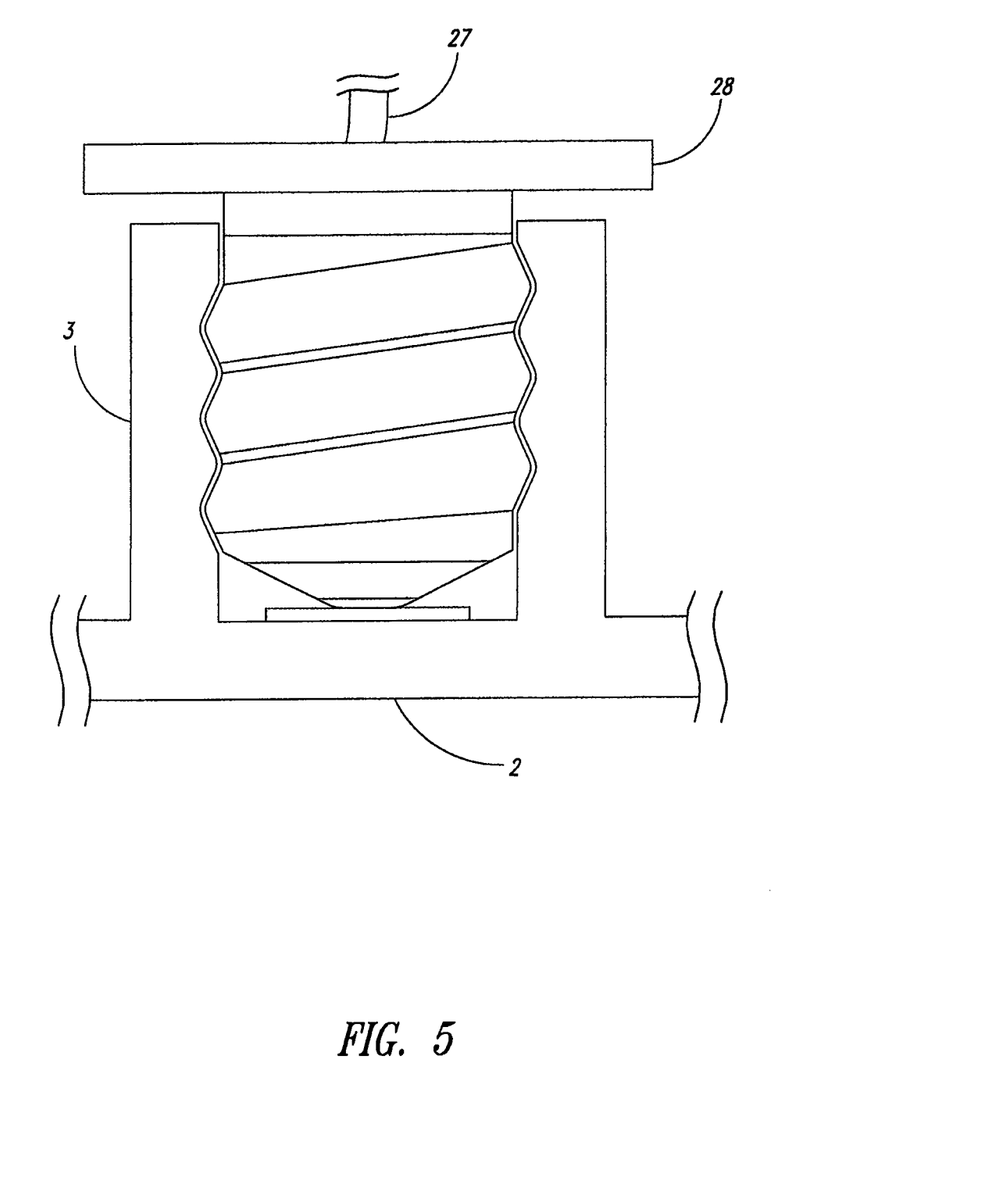
FIG. 5 is a diagram showing a lamp socket of a conventional light fixture receiving a lamp base according to one non-limiting illustrated embodiment.

In one embodiment, the illumination device 10 includes a lighting device 20 and a heat sink 30. The lighting device 20 includes a base plate 22, at least one light emitter 24 (only one called out in FIG. 2), an electronic ballast 26, power wirings 27, and a lamp base 28. In one embodiment, the at least one light emitter 24 includes one or more solid-state light emitters. In one embodiment, the at least one light emitter 24 includes one or more light-emitting diodes (LED). The lamp base 28 is structured to be receivable in a lamp socket for a gas-discharge lamp, so as to facilitate retrofitting a conventional gas-discharge luminaire with the illumination device 10. In one embodiment, the lamp base 28 is a threaded base sized and dimensioned to be screwed into the threaded lamp socket 3 of conventional light fixtures 2 (FIG. 5).

The at least one light emitter 24 is mounted onto the base plate 22, and the base plate is thermally coupled to the heat sink 30, so that a good thermally conductive path is established. In this way, at least a majority of the heat generated by the light emitter 24 is transferred to the base plate 22 by conduction, which in turn transfers a portion of that heat to the heat sink 30 also by conduction in addition to dissipating a portion of the heat by convection and radiation. The base plate 22 may be physically attached to the heat sink 30 by mechanical means, such as screws, nuts and bolts and/or latches, and/or by adhesive means, such as epoxy adhesives or the like.

In one embodiment, the heat sink 30 includes a contact plate 36 to which the base plate 22 is directly in contact with over a relatively large area when the base plate 22 is physically attached to the heat sink 30. The contact plate 36 may be of the same or similar size and/or shape as the base plate 22. Alternatively, the contact plate 36 may be larger or smaller than the base plate 22. Direct contact between the base plate 22 and the contact plate 36 of the heat sink 30, promotes conductive heat transfer from the light emitter 24 to the base plate 22 and then from the base plate 22 to the heat sink 30.

The heat sink 30 may included threaded holes to receive screws (not shown), in one embodiment, or latches 32a and 32b, in another embodiment, to detachably or removably mount the heat sink 30 to the light fixture 2 (FIG. 1). In one embodiment, the latches 32a and 32b are "toggle" latches similar to the existing latches 7 on the cover/refractor 4 of the luminaire 1 (FIG. 1). Many luminaires that comply with the NEMA standards have standard mounting tabs that accept standard mounting latches, as in the case of the light fixture 2. Accordingly, the heat sink 30 can be mounted to the light fixture 2 (FIG. 1) using the latches 32a and 32b, without the use of tools.

The heat sink 30 has a large total exposed surface area so that heat is effectively convected and radiated away to enhance heat dissipation. In one embodiment, the heat sink 30 has a plurality of protrusions 34 to increase or maximize the exposed surface area for a given volume. As illustrated, the plurality of protrusions 34 may take the form of a plurality of fins. The fins may be placed in a concentric arrangement and extend away from a central axis of the heat sink 30, such as illustrated in FIG. 2. In one embedment, the protrusions 34 are die-cast protrusions. Alternatively, the protrusions 34 are stamped metal plates that are attached to an exterior of the heat sink 30 and/or the contact plate 36, for example, via welding or soldering.

Per industry-accepted practices, the total exposed surface area (i.e., convecting and/or radiating surface area) of a heat sinking device should be greater than 30 square centimeters per Watt of light emitter power in order to keep a lamp at or below a safe operating temperature. For example, an exposed surface area of at least 1,200 square centimeters (i.e., 186 square inches) is required to maintain the operating temperature of a 40-Watt lamp at or below a nominal safe operating temperature. Improved cooling by the heat sink 30 may extend the operational life of the light emitter(s) 24 when the exposed surface area of a heat sink is at least 30 square centimeters per Watt ($cm^2$/Watt) times the maximum Wattage rating of the light source(s). Thus, in one embodiment, the exposed surface area of the heat sink 30 is at least 30 square centimeters per Watt ($cm^2$/Watt) times a sum of the maximum Wattage rating of all of the light emitters 24. In one embodiment, a temperature of the base plate 22 at a location proximate the mounting location of the light emitters 24 is maintained at no more than approximately 20° C. above the ambient temperature surrounding the illumination device 10.

The lighting device 20 may also include a substantially transparent or translucent optical cover plate 25. The optical cover plate 25 is mounted to the base plate 22 to direct light emitted by the light emitter(s) 24 into an acceptable or desired illumination pattern at a ground level. In one embodiment, the illumination pattern is a NEMA designated "butterfly" pattern that distributes the light evenly over a large area on the ground. A weather seal may be provided between the base plate 22 and the optical cover plate 25 to exclude moisture and other contamination elements from the at least one light emitter 24 and other electronic components on the base plate 22. Alternatively, the optical cover plate 25 may act as a weather seal. The optical cover plate 25 may have elements that are optically reflective, optically refractive, or both. In one embodiment, the optical cover plate 25 has a number of refraction lenses 25r (only one called out in FIG. 2) distributed and located on the optical cover plate 25 such that each of the refraction lenses 25r is in registration with a respective one of the light emitters 24. The refraction lenses 25r may be structured to function as an optical refractor to direct light emitted by the respective light emitter 24 to a desired pattern, such as the NEMA "butterfly" pattern.

The illumination device 10 is coupled to receive power from a power supply when the lamp base 28 is inserted into a receptacle, such as a lamp socket, that is connected to the power supply. Electrical power from the power supply, such as AC power mains, is provided to the light emitter(s) 24 through the lamp base 28, the power wirings 27, and the electronic ballast 26. The electronic ballast 26 converts the voltage of the received power, for example, converting 120 volts AC to a current that is below the maximum safe operating current of the light emitter(s) 24. The electronic ballast 26 may take the form of a current regulator that transforms the relatively high voltage and current from the AC power mains into a typically lower voltage with a regulated current suitable for the light emitter(s) 24. In one embodiment, the electronic ballast 26 is a switch-mode flyback type current regulator. In another embodiment, the electronic ballast 26 is a switched LED string type ballast which switches in and out LED strings as needed to match the input line voltage.

Some gas-discharge luminaires, such as the high-pressure sodium (HPS) type or the metal halide (MH) type, may have an igniter circuit that is used to strike an arc in the gas-discharge lamp at startup. In one embodiment, the electronic ballast 26 can suppress and absorb this ignition voltage until the load presented to the igniter by the electronic ballast 26 causes the igniter to shut down. The electronic ballast 26 additionally or alternatively may include circuitry to suppress electrical noise, and to prevent electrical noise from being conducted out of the electronic ballast 26. When a conventional gas-discharge luminaire is retrofitted with the illumination device 10, the existing igniter circuit of the luminaire may be left in place without harm, or removed to save energy. Alternatively, the igniter circuit may be unplugged and a circuit jumper installed on the existing terminals to eliminate the power consumption of the igniter and prevent its potential failure at some future time. The existing magnetic or electronic ballast that regulates the current supplied to the gas-discharge lamp may be left in place when retrofitting to ease installation of the illumination device 10. Alternatively, the existing magnetic or electronic ballast may be wired around when retrofitting for further energy saving.

As shown in FIG. 2, the electronic ballast 26 is mounted on the base plate 22. Alternatively, the electronic ballast 26 may be either attached directly to the lamp base 28 or wired proximate to but not carried directly by the lamp base 28. In such alternative embodiments, the electronic ballast 26 may be housed in a fixture, such as the light fixture 2, when the illumination device 10 is fitted to the fixture. When the electronic ballast 26 is mounted on or carried by the base plate 22, a large portion of the heat generated by the electronic ballast 26 can be transferred to the heat sink 30 via conduction.

Figure 3:
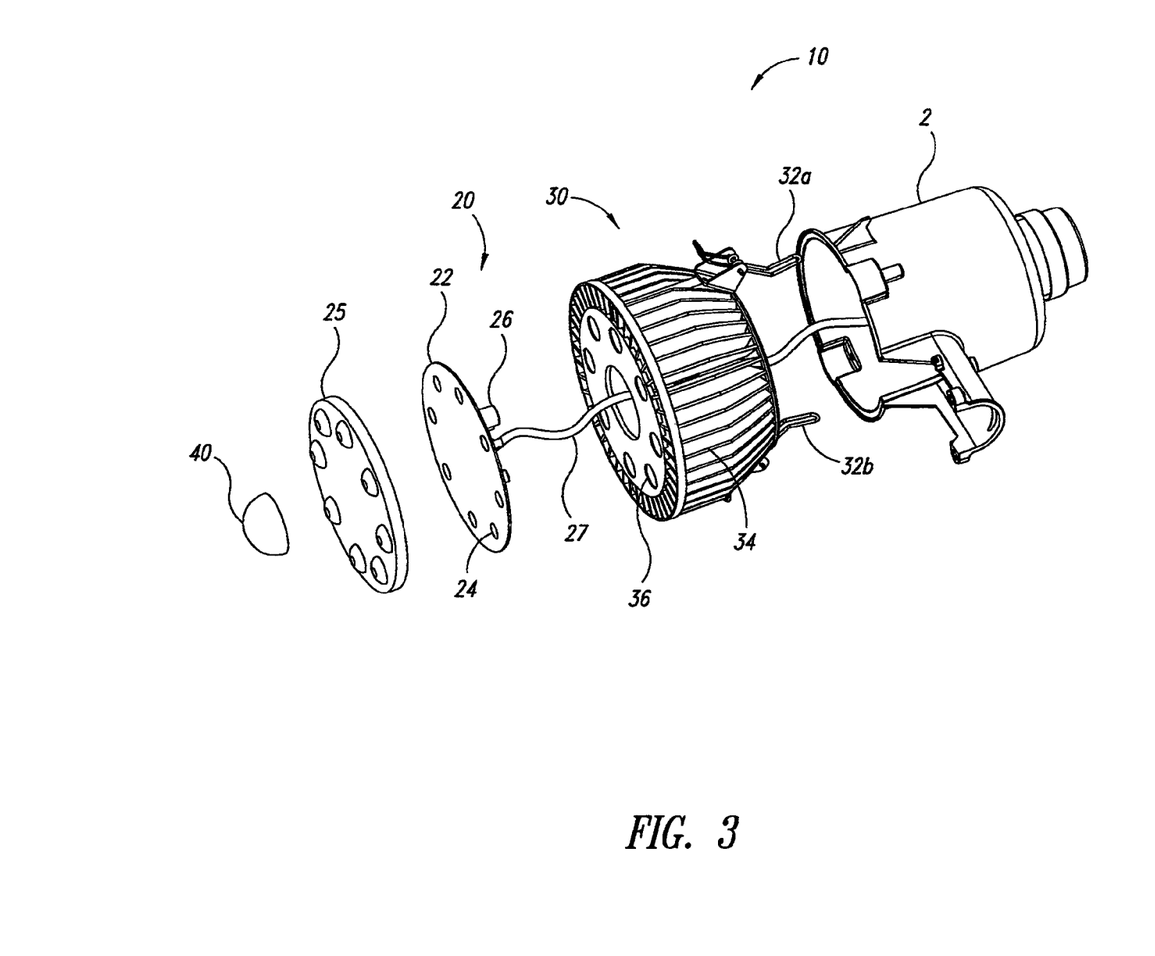
FIG. 3 is an assembly diagram showing a conventional light fixture retrofitted with an illumination device according to one non-limiting illustrated embodiment.

FIG. 3 shows the light fixture 2 being retrofitted with the illumination device 10 according to one embodiment.

The illumination device 10 is attached to the light fixture 2 using the latches 32a and 32b. The lamp base 28 (FIG. 2) of the illumination device 10 is inserted into the lamp socket 3 of the light fixture 2 to electrically couple the lamp base 28 to receive electrical power. The at least one light emitter 24 includes a plurality of LEDs, which may be distributed evenly on the base plate 22, for example, as illustrated in FIG. 3. The electronic ballast 26 may be mounted on the base plate 22 to enhance heat dissipation by conduction through the heat sink 30. The substantially transparent optical cover plate 25 is mounted on the base plate 22 to provide optical refraction and/or reflection. A weather seal may be inserted between the optical cover plate 25 and the base plate 22. Alternatively, the optical cover plate 25 may form a weather seal with the base plate 22.

In one embodiment, the illumination device 10 may include a sensing device 40. The sensing device 40 may, for example, be mounted on the lighting device 20, for instance mounted on the optical cover plate 25. The sensing device 40 can alternatively be mounted on the base plate 22, for example, where the lighting device 20 does not include the optical cover plate 25.

In one embodiment, the sensing device 40 is a motion sensor that detects motion and controls the operation of the lighting device 20 based on the detection of motion. Motion may indicate the presence of someone and hence the need for illumination.

In one embodiment, the sensing device 40 is a passive infrared (PIR) detecting sensor. The PIR sensor detects the radiated long wave infrared energy emitted by humans, automobiles or other heat source. Heat may indicate the presence of someone and hence the need for illumination.

Alternatively or additionally, the sensing device 40 may include a solid-state camera that captures images of an area, such as the area to be illuminated, and a controller coupled to the solid-state camera to process the captured images and control the operation of the lighting device 20 as described above. The controller may include a microprocessor and/or digital signal processor configured to detect an appearance or changes of position of objects between images captured at different times that may be indicative of the presence of someone and hence the need for illumination.

The sensing device 40 may be advantageously used to switch the at least one light emitter 24 from a first illumination level to a second illumination level that is higher than the first illumination level when the sensing device 40 detects an ambient characteristic (e.g., motion, heat) that is indicative of a presence of a person. For instance, before detection, light emitted by the light emitter(s) 24 may be at the first illumination level, and in response to detection by the sensing device 40 the at least one light emitter 24 is switched to emit light at the second illumination level. The light emitter(s) may be returned to the first illumination level at a defined time after the initial detection or after a most recent detection of the ambient characteristic. The defined time period may be pre-configured (i.e., hardwired) or may be user selectable. This approach may greatly reduce energy consumption of the lighting device 20 since the higher illumination level, hence higher energy consumption, is provided only when such illumination is needed. In one embodiment, the first illumination level is 10% of the full illumination level that the light emitter(s) 24 is (are) able to produce. In one embodiment, the second illumination level is the full illumination level that the light emitter(s) 24 is (are) able to produce.

Installation of the illumination device 10 to retrofit a conventional luminaire 1 having an existing lamp, such as the gas-discharge lamp 5, should be quite simple. With reference to the conventional luminaire 1 of FIG. 1, the existing lamp 5 and existing cover/refractor 4 are detached or otherwise removed from the light fixture 2. The lamp base 28 (FIG. 2) of the illumination device 10 is inserted into the lamp socket 3 of the light fixture 2. The heat sink 30 of the illumination device 10 is latched, screwed or otherwise attached onto the light fixture 2. The lighting device 20 is physically attached to the heat sink 30, and can be mounted to the heat sink 30 before or after the heat sink 30 is latched, screwed or otherwise attached onto the light fixture 2. In one embodiment, the illumination device 10 is pre-assembled prior to retrofitting a conventional luminaire 1 with the illumination device 10. In such case, the lighting device 20 is physically attached to the heat sink 30 prior to the retrofitting. If desired, when retrofitting a conventional luminaire 1 with the illumination device 10, the existing ballast for the replaced lamp may be left in the circuit or wired around for more energy savings.

Figure 4:
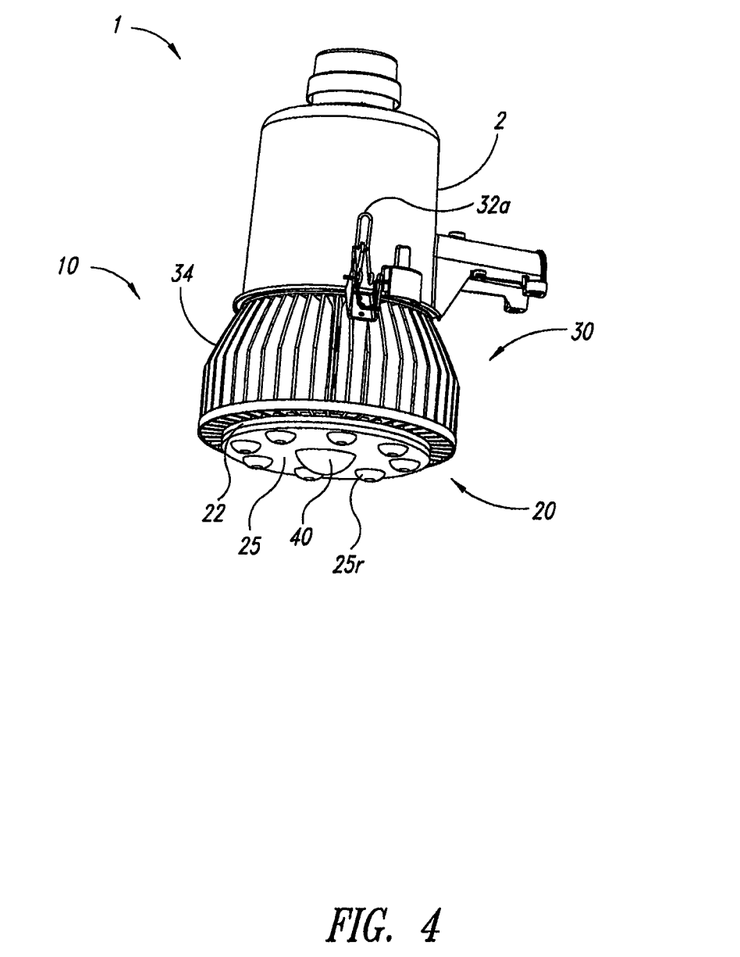
FIG. 4 is another assembly diagram showing a conventional light fixture retrofitted with an illumination device according to one non-limiting illustrated embodiment.

FIG. 4 shows a luminaire 1 having the light fixture 2 retrofitted with the illumination device 10 according to one embodiment. In this embodiment, the illumination device 10 is toggle latched to the light fixture 2 with the latches 32a and 32b on the heat sink 30. The sensing device 40 is mounted onto the optical cover plate 25. In the embodiment shown in FIG. 4, there are eight light emitters, such as solid-state light emitters or LEDs, that constitute the at least one light emitter 24. Accordingly, there are eight refraction lenses 25r on the optical cover plate 25 with each of the refraction lenses 25r in registration and/or aligned with respective ones of the light emitters.

FIG. 5 shows the lamp base 28 of the illumination device 10 threadedly inserted in the threaded lamp socket 3 of the light fixture 2.

Thus, an illumination device, such as the illumination device 10, is disclosed herein and should greatly improve upon the problems associated with mercury-vapor lamps and other gas-discharge lamps described above. For instance, the illumination device 20 does not contain mercury or other substances restricted by statutes governing the reduction of hazardous substances. By using solid-state light emitters 24 such as LEDs, the illumination device 10 has a much higher power factor of approximately 0.85 pf. Power consumed by the illumination device 10 falls from, for example, 175 watts for a typical mercury-vapor lamp to less than 50 watts. The illumination device 10 has a CRI of at least 75, providing a much better visual perception of an illuminated scene and requiring lower power to provide the desired illumination. Because solid-state light emitters can typically be turned ON and OFF almost instantly as power is applied or removed, the illumination device 10 permits the use of a variety of sensing devices 40 (e.g., motion, heat, presence/absence sensors). No active cooling is needed because of the large surface area of the heat sink 30, which replaces the cover/refractor of a conventional luminaire.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of retrofitting gas-discharge lamps generally described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An illumination device, comprising:
a solid-state lighting device including at least one light-emitting diode (LED), an electronic ballast to regulate electrical power supplied to the LED, and a base plate on which the at least one LED and the electronic ballast are mounted;
a lamp base directly, selectively, and physically receivable by a socket disposed in a lighting fixture, the socket configured to accept the electrical coupling of a gas-discharge lamp; and
a heat sink having a plurality of fins;
wherein, the heat sink includes a number of fasteners that selectively, directly, and physically couple the heat sink to the lighting fixture such that, in use, the heat sink forms at least a portion of an exterior surface of the lighting fixture with at least a portion of the plurality of fins exposed to an ambient environment that is external to the exterior surface of the lighting fixture;
wherein the heat sink includes a contact plate in direct physical contact with and conductively thermally coupled to the base plate on which the at least one LED is mounted to dissipate a majority of heat generated by the solid-state lighting device via convective and/or radiant heat transfer with the ambient environment via the plurality of fins which are exposed to the ambient environment during use; and
wherein the heat sink couples to the lamp base via one or more flexible connectors.

2. The illumination device of claim 1 wherein the plurality of fins includes a plurality of die-cast fins.

3. The illumination device of claim 2 wherein the plurality of fins has a total exposed surface area equal to or greater than an area of 30 square centimeters per Watt ($cm^2$/Watt) times a maximum Wattage rating of the lighting device, the total exposed surface area comprising a cumulative area of the surfaces of the fins that provide convective and/or radiative heat transfer.

4. The illumination device of claim 1 wherein the heat sink has a total exposed surface area sufficient to convectively and/or radiatively dissipate heat generated by the at least one LED to maintain a temperature on the base plate proximate where the at least one LED is located to be no more than 20 degrees Celsius (° C.) above an ambient temperature.

5. The illumination device of claim 1 wherein the electronic ballast comprises a switch-mode flyback current regulator.

6. The illumination device of claim 1 wherein the solid-state lighting device further includes:
a light transmissive cover mountable on the base plate.

7. The illumination device of claim 6 wherein the light transmissive cover includes at least one optical refractor that directs light emitted from the at least one LED into a National Electrical Manufacturers Association (NEMA) butterfly pattern.

8. The illumination device of claim 6 wherein the light transmissive cover is at least optically refractive or optically reflective.

9. The illumination device of claim 1, further comprising:
a sensor switch device that senses an ambient characteristic indicative of a presence, the sensor switch device coupled to control operation of the solid-state lighting device based on the sensed ambient characteristic.

10. The illumination device of claim 9 wherein the sensing device comprises a motion activated sensor.

11. The illumination device of claim 9 wherein the sensor switch device comprises a passive infrared (PIR) detector.

12. The illumination device of claim 9 wherein the sensor switch device includes:
a solid-state camera operable to capture images of an area over a period of time; and
a controller coupled to process the captured images from the solid-state camera and control operation of the solid-state lighting device based on the captured images.

13. The illumination device of claim 9 wherein the sensor switch device controls an intensity of illumination by the solid-state lighting device based on the sensed ambient characteristic.

14. The illumination device of claim 1 wherein the contact plate is in direct physical contact with the base plate over a relatively large area of the base plate.

15. The illumination device of claim 1, wherein said base plate has a coupling face contacting the contact plate, and the electronic ballast is mounted on the coupling face, wherein the contact plate has one or more apertures to accommodate the mounted ballast.

16. The illumination device of claim 1, wherein the heat sink comprises a plurality of fins positioned perpendicular to and arranged concentrically around the contact plate, and conductively thermally coupled to said contact plate.

17. An illumination device, comprising:
a solid-state lighting device including at least one light-emitting diode (LED), an electronic ballast to regulate electrical power supplied to the LED, and a base plate on which the at least one LED and the electronic ballast are mounted;
a heat sink having a plurality of fins;
wherein the heat sink includes a number of fasteners that directly, physically, and selectively couple the heat sink to the lighting fixture such that, in use, the heat sink forms at least a portion of an exterior surface of the lighting fixture with at least a portion of the plurality of fins exposed to an ambient environment that is external to the exterior surface of the lighting fixture;
wherein the heat sink conductively thermally coupled to the base plate on which the at least one LED is mounted to dissipate heat generated by the solid-state lighting device via the plurality of fins which are exposed to the ambient environment during use; and
a lamp base coupled via a flexible coupling to the heat sink and coupled to the solid-state lighting device;
wherein the lamp base is directly, selectively, and physically receivable by a lamp socket disposed in the lighting fixture, the lamp socket configured to receive a gas-discharge lamp; and
wherein, in operation, the lamp base provides electrical power from power mains to the solid-state lighting device via one or more conductors included in the flexible coupling between the lamp base and the heat sink when the lamp base is received in the lamp socket that is electrically coupled to the power mains.

18. An illumination device, comprising:
a lighting device including:
a lamp base that is directly, selectively, and physically receivable in a lamp socket of a lighting fixture configured to receive a gas-discharge lamp to receive power through the lamp socket of the lighting fixture;
a plurality of solid-state light emitters;
an electronic ballast that regulates power supplied to the solid-state light emitters;
a base plate on which the solid-state light emitters and the electronic ballast are mounted; and
a heat sink having a plurality of fins;
wherein the heat sink includes at least one fastener that rigidly, directly, and physically couple the heat sink to the lighting fixture such that, in use, the heat sink forms at least a portion of an exterior surface of the lighting fixture with at least a portion of the plurality of fins exposed to an ambient environment that is external to the exterior surface of the lighting fixture;
wherein the heat sink includes a contact plate in direct physical contact with and conductively thermally coupled to the base plate to convectively and/or radiantly dissipate heat generated by the lighting device into an ambient environment via the plurality of fins which are exposed to the ambient environment during use; and
wherein the heat sink couples to the lamp base via at least one flexible coupling that, in use, transfers electrical power from the lamp socket of the lighting fixture to at least the electronic ballast.

19. The illumination device of claim 18 wherein the plurality of solid-state light emitters comprises a plurality of light-emitting diodes (LEDs).

20. The illumination device of claim 18 wherein the at least one fastener includes a plurality of latches.

21. The illumination device of claim 18 wherein the plurality of fins comprises a plurality of die-cast fins.

22. The illumination device of claim 18 wherein the plurality of fins comprises a plurality of stamped metal plates.

23. The illumination device of claim 18 wherein the heat sink has a total exposed surface area equal to or greater than an area of 30 square centimeters per Watt ($cm^2$/Watt) times a maximum Wattage rating of the lighting device.

24. The illumination device of claim 18 wherein the heat sink has a total exposed surface area sufficient to dissipate heat generated by the lighting device to maintain a temperature on the base plate proximate the solid-state light emitter be no more than 20 degrees Celsius (° C.) above an ambient temperature.

25. The illumination device of claim of claim 18, further comprising:
a control device controllingly coupled to the lighting device to control operation of the lighting device.

26. The illumination device of claim 25 wherein the control device comprises a motion sensor to detect motion.

27. The illumination device of claim 25 wherein the control device comprises a passive infrared (PIR) detector to detect heat.

28. The illumination device of claim 25 wherein the control device comprises:
a solid-state camera capturing images of an area; and a processor coupled to receive and process the captured images from the solid-state camera and filter coupled to control operation of the solid-state lighting device based on the captured images.

29. The illumination device of claim 25 wherein the control device controls an intensity of illumination by the lighting device based on a sensed ambient characteristic.

30. The illumination device of claim 18, wherein the contact plate is in direct physical contact with the second end of the heat sink.

* * * * *